United States Patent Office

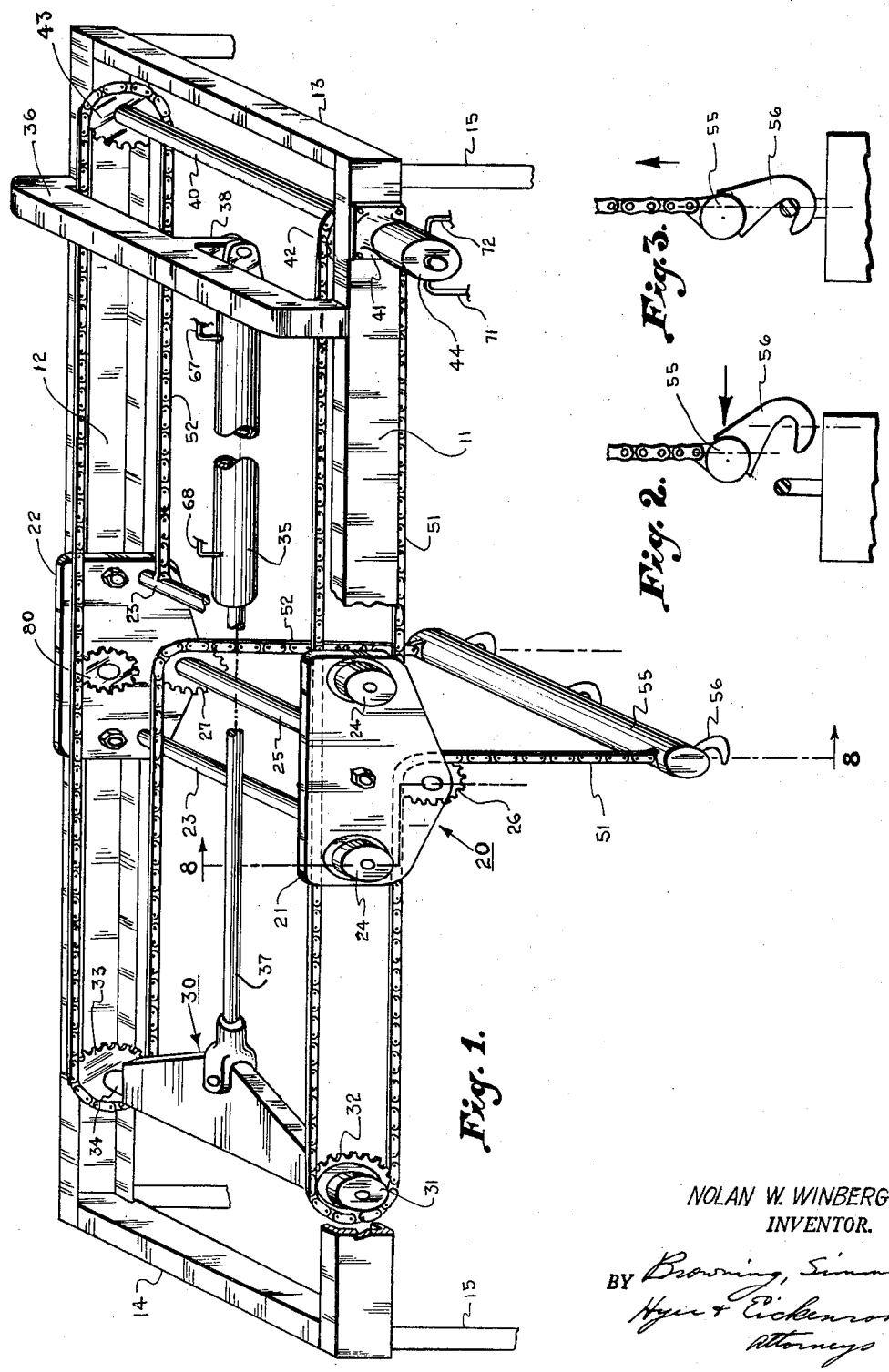

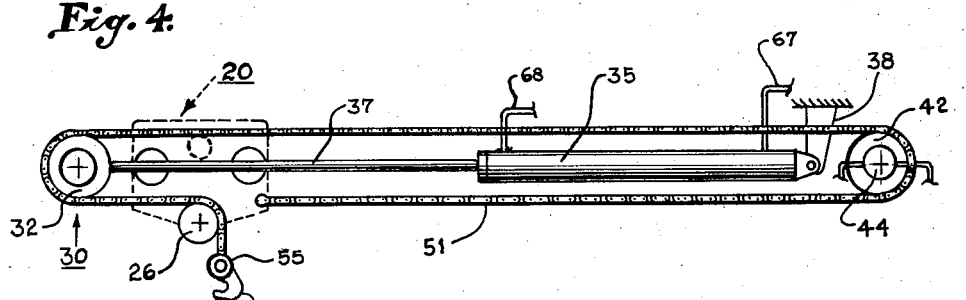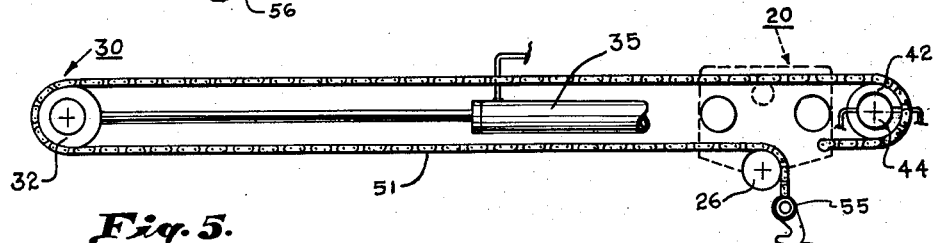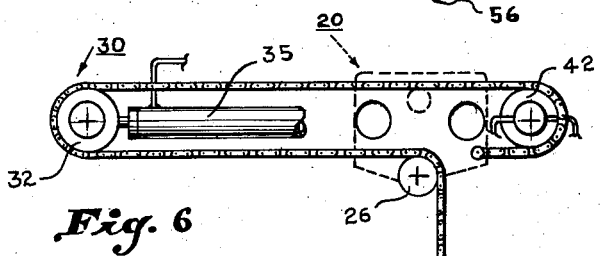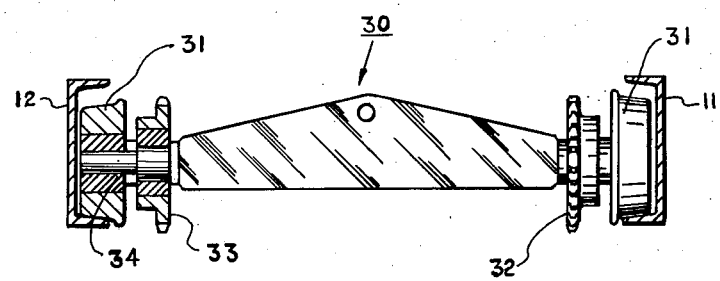

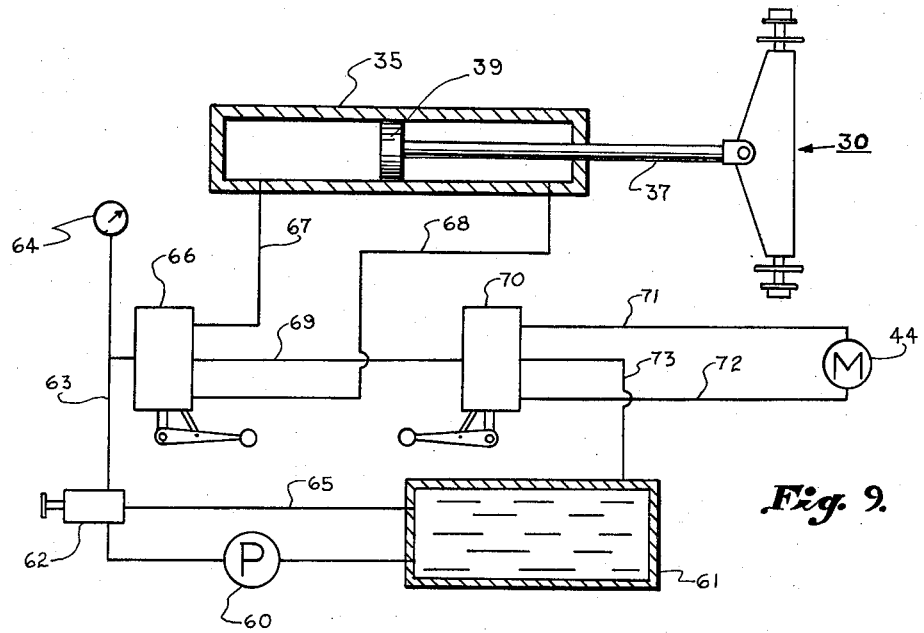
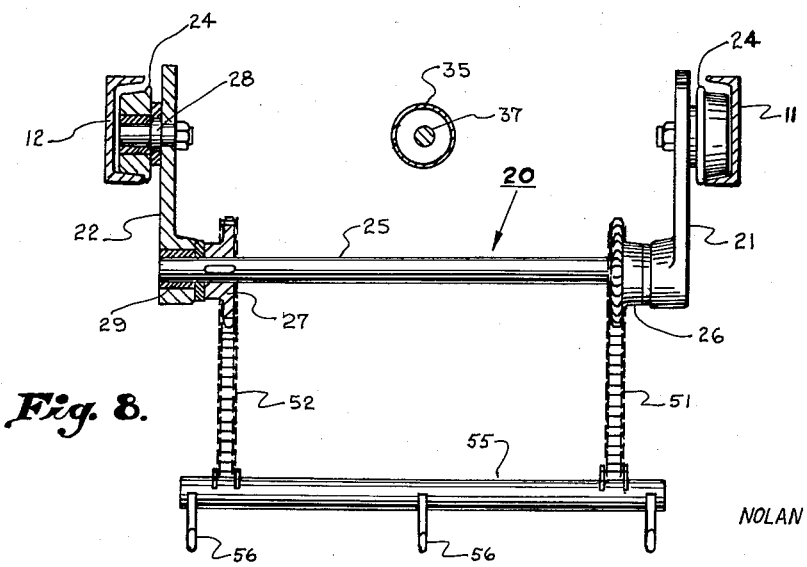
NOLAN W. WINBERG
INVENTOR.

3,103,395
Patented Sept. 10, 1963

3,103,395
LOAD HANDLING APPARATUS
Nolan W. Winberg, Beaumont, Tex.
Filed Aug. 6, 1962, Ser. No. 214,999
11 Claims. (Cl. 212—74)

This invention relates to load handling apparatus, and more particularly to apparatus for raising and lowering weights and providing for transverse movement thereof. It is an object of the invention to provide improved apparatus of that character.

Apparatus constructed in accordance with the present invention is particularly adapted to moving a weight between two positions of substantially different elevation and which may be also even greater distances from each other in a horizontal direction, and for accomplishing this with facility and efficiency and with a minimum of apparatus. Apparatus constructed in accordance with the present invention is therefore well adapted to the transfer of a weight between a table, truck or other elevated platform and a closely adjacent position at floor level or ground level.

Accordingly, it is another object of the invention to provide improved weight handling apparatus having a minimum number of parts.

It is a further object of the invention to provide improved weight handling apparatus which is efficient and which lends itself readily to automatic, remote operation.

Another object of the invention is to provide improved weight handling apparatus which is inherently rugged in construction, efficient in operation, and economical to manufacture and operate.

In accordance with a preferred embodiment of the invention a carriage is arranged to travel along a pair of tracks. A pair of chains extend from the carriage, parallel to the tracks and around a pair of sprockets on a fixedly positioned drive shaft. The chains then extend past the carriage, and around a pair of sprockets on a crosshead which is also arranged to travel along the tracks. Finally, the chains extend back to the carriage, over a pair of sprockets mounted on the carriage, and down to a lifting yoke. Movement of the crosshead along the tracks raises and lowers the lifting yoke, while rotation of the drive shaft causes movement of the carriage, and, hence, of the yoke, along the tracks, both operations being effected through the same chains.

Other objects and advantages of this invention will become apparent from the following description taken in connection with the accompanying drawings wherein are illustrated certain embodiments illustrative of this invention.

In the drawings:

FIG. 1 is a perspective view of apparatus illustrating a preferred embodiment of the invention, parts being broken away for purposes of illustration;

FIG. 2 is a side elevational view of a lifting yoke and hook preferably employed in the apparatus of FIG. 1, the hook being shown in its normal or released position;

FIG. 3 is a view similar to FIG. 2 but showing the hook in operating or weight lifting position;

FIG. 4 is a schematic representation of the principal operating parts of the apparatus of FIG. 1 as viewed from the side and with the lifting yoke in raised position;

FIG. 5 is a view similar to FIG. 4 but showing the lifting yoke horizontally displaced from its position in FIG. 4;

FIG. 6 is a view similar to FIG. 5 but showing the lifting yoke in a lowered position;

FIG. 7 is a vertical cross sectional view through the track and the equipment on one end of the crosshead member included in the apparatus of FIG. 1, the crosshead being also shown but rotated to a position at right angles to its normal position and shown in plan;

FIG. 8 is a vertical, cross sectional view of a carriage and a lifting yoke incorporated in the apparatus of FIG. 1, taken along the line 8—8 of FIG. 1; and FIG. 9 is a schematic representation of hydraulic control apparatus which may be employed with the apparatus of FIG. 1.

The weight handling apparatus illustrated in FIG. 1 includes a track of any suitable construction, in this case comprising a pair of rails 11 and 12 which are in the form of channels. These rails are preferably rigidly connected to each other as by frame members 13 and 14 and may be supported by any suitable means such as legs 15. The legs 15 may support the rails 11 and 12 in a fixed position, if desired, or they may support the rails on a truck such that the entire weight handling apparatus may readily be transported. Still further, the supporting structure may, of itself, be wheeled such that it is readily located at a desired position.

A carriage 20 is provided for directly suspending the load, and is movably mounted on the track for traversing the same. It includes, in the present example, end plates 21 and 22, tie bars 23 and 23', and wheels 24 engaging the rails 11 and 12. The wheels are mounted on both end plates 21 and 22 through suitable bearings 28, as best shown in FIG. 8. The carriage also includes a rotatable shaft 25 on which a pair of sprockets 26 and 27 are arranged, the sprockets preferably being rigidly secured to the shaft 25 and providing guides for the elongated, flexible, load bearing members presently to be described. The shaft is arranged to rotate within suitable bearings 29 mounted on the respective end plates of the carriage 20, also best shown in FIG. 8.

A crosshead 30 is provided with wheels 31 for rolling along the tracks 11 and 12 but may be guided in any way desired in any direction of movement with respect to the track. A pair of sprockets 32 and 33 are rotatably supported on the crosshead 30 inwardly of the wheels 31. Preferably the wheels 31 and the sprockets 32 and 33 are rotatable on a stub shaft portion 34 carried on each end of the crosshead 30 in the manner illustrated in FIG. 7.

The crosshead 30 is arranged to be moved by an hydraulic motor 35 comprising a cylinder and double acting piston. The cylinder is pivotally mounted, as shown, on a depending bracket arm 38 of a crossbar 36 which is secured to and bridges the tops of the tracks 11 and 12. A piston rod 37 extends from the piston 39 of the hydraulic motor and is pivotally connected to the crosshead 30 as shown. It will be apparent that as fluid is alternately injected into one end of the hydraulic motor and allowed to escape from the other the crosshead 30 may be caused to move relative to the tracks 11 and 12.

It is necessary that the motor 35 have a stroke of at least half the extent of the maximum load lift to be obtained in the finished device and it is desirable that it be located within the confines of the frame, and, still further, that it act along a line parallel to the tracks 11 and 12. If excessive length of the device is to be avoided this requires that it extend past the carriage 20. Accordingly, the carriage is of a drop-center construction as it clearly shown in FIG. 8.

A drive shaft 40 is rotatable within suitable bearings 41 which are supported on the tracks 11 and 12. The drive shaft 40 has rigidly secured thereto a pair of sprockets 42 and 43, and a reversible hydraulic motor 44 is arranged to rotate the shaft 40 and hence the sprockets 42 and 43 in either direction as desired.

A chain 51 constituting an elongated, flexible load bearing member, has one portion anchored to the crossbar 23 of the carriage 20 and extending from the carriage in one direction along the track to the drive shaft 40 and up over the sprocket 42. From here the chain, as seen in FIG. 1, extends horizontally to the left, past the carriage, and passes down over the sprocket 32, and then horizontally to the right and over the sprocket 26. Thus below the sprocket 26 it has a second portion extending transversely of the track from the carriage, and a third portion between the first and second portions extending from the carriage in the opposite direction from the first portion. A loop is formed between the first and third portions, and is maintained by the sprocket 42 on an axis fixed with respect to the track and the sprocket 32 movable relative to the track. A similar chain 52 is connected to the same crossbar 23, extends up over the sprocket 43 down over the sprocket 33 and over the sprocket 27.

The two free ends of the chains 51 and 52 are secured to a yoke 55 from which depend one or more load supporting hooks 56. The hooks 56 are preferably mounted on the yoke 55 in such position that they normally hang when not loaded, in the position of FIG. 2. Due to this fact the hooks when not loaded may readily swing laterally to engage a load in the manner shown in FIG. 2, and, when it is desired to unload it, this may be effected by merely lowering it until it is relieved of the weight of the load, whereupon it will swing laterally by gravity from the loaded position of FIG. 3 to the released position of FIG. 2.

The operation of the apparatus thus far described will now be explained with particular reference being made to FIGS. 4, 5 and 6. Let it be assumed that the apparatus is in the condition illustrated in FIG. 4. When the hydraulic motor 44 is operated to drive the sprockets 42 and 43 in a counterclockwise direction the chains are moved longitudinally of themselves within the aforementioned loops with respect to the fixed sprockets 42 and 43 and thereby the carriage 20 is moved to the right, as from the position of FIG. 4 to the position of FIG. 5. It should be noted that the chain 51 extends from a fixed point on the carriage 20, namely the crossbar 23, around two sprockets 42 and 32, which remain in their same relative locations, and back to a point on the carriage, namely the sprocket 26. Accordingly, since the sprockets 42 and 32 determine the size of the loop in chains 51, when the carriage moves along the tracks, the loops in the chains may remain the same size and hence the level of the yoke 55 remains constant, all as is clearly apparent upon reference to FIGS. 4 and 5.

If the hydraulic motor 35 is operated to draw the crosshead 30 from left to right, as from the position of FIG. 5 to the position of FIG. 6, the size of the loop in each of the chains is changed and the lifting yoke 55 is lowered. It will be apparent that the length of chain required to extend from the crossbar 23 on the carriage, around the sprocket 42 around the sprocket 32 and back to the sprocket 26 on the carriage is reduced by twice the distance between the position of the crosshead 30 in FIG. 5 and the position in FIG. 6. The lifting yoke 55 is accordingly lowered by that amount.

An hydraulic system suitable for operation of the hydraulic motors 35 and 44 is illustrated schematically in FIG. 9. A pump 60 draws fluid from a reservoir 61 through a relief value 62 which limits fluid pressure in line 63 to a predetermined maximum, indicated by a pressure gauge 64, by bleeding fluid back to the reservoir 61 through a line 65. A four-way control valve 66 of the "open center" variety controls the flow of fluid from the line 63 to one side of the motor 35 through a line 67, and, selectively, to the other side of the motor 35 through a line 68. In this manner, the crosshead 30 may be made to traverse the tracks 11 and 12. Characteristically of its "open center" type, the valve 66, when in neutral position, will permit free flow from the inlet line 63 to the outlet line 69 which is also the inlet line of valve 70.

When the valve 66 is actuated to pass fluid from the line 63 to the line 67, it connects the line 68 from the opposite end of the motor to the fluid return line 69 by which fluid is returned through valve 70, which is also an "open center" type valve, to the reservoir. When the valve 66 passes fluid from the line 63 to the line 68, it permits the return flow of fluid from the other end of motor 35 through the line 67 to the exhaust line 69 and thence through valve 70 to the reservoir 61.

The valve 70 receives power fluid from supply line 63 through valve 66 and line 69 when valve 66 is in neutral position and may be moved to direct such fluid to either line 71 or 72 selectively so as to force fluid selectively in either direction through the motor 44. The valve 70 is arranged to connect the other of such lines 71 and 72 simultaneously to the return line 73 so that fluid after being forced through the motor 44 will be conducted back to the reservoir 61.

It may now be seen that operation of the valve 66 serves to actuate the motor 35 and the crosshead 30 to raise and lower the lifting yoke 55. Operation of the valve 70 causes rotation of the motor 44 in either direction to cause the carriage 20 to traverse the tracks 11 and 12, with the lifting yoke 55 maintained at a constant level. The two may be operated selectively or simultaneously as desired, but obviously if operated simultaneously the total fluid pressure available will be divided in the example shown, between the motors 35 and 44.

The hydraulic control apparatus shown in FIG. 9 and described above is merely representative of the type of control apparatus which may be employed for automatic, remote control of the apparatus of FIG. 1. It will be apparent to those skilled in the art that various forms of hydraulic or pneumatic control apparatus may be employed, and that other forms of control apparatus, such as electric motors and controls, may be employed.

As will be obvious to those skilled in the art, the sprockets 26, 32 and 42 are so oriented and positioned as to permit operation with the single chain 51. Similarly the sprockets 27, 33 and 43 are oriented and positioned to cooperate with the single chain 52. Preferably, the crossbar 23 is at the level of the lowest points of the sprockets 42 and 43. Preferably the uppermost points of the sprockets 42 and 43 are at the same level as the uppermost points of the sprockets 32 and 33. Still further, the lowest points of the sprockets 32 and 33 are preferably at the same level as the uppermost points of the sprockets 26 and 27. This results in substantially horizontal segments of chain between sprockets such that all forces applied to the carriage 20 and the crosshead 30 are substantially parallel to the tracks 11 and 12, with the exception of the vertical pull of the lifted weight. Preferably an idler sprocket 80 is rotatably supported on each of the end plates 21 and 22 of the carriage 20 to support the chains 51 and 52 in substantially horizontal positions.

It should be noted, however, that it is not necessary that the chains extend exactly parallel to the tracks 11 and 12, or that they pass from top to bottom or from bottom to top about the various sprockets in the illustrated, preferred manner. The important factors are that the chains be secured to the carriage and extend around the sprockets 42 and 43 and around the sprockets 32 and 33 and over the sprockets 26 and 27.

It is indicated above that the chain segments preferably extend horizontally between sprockets in order to provide for the application of only horizontal forces to the pertinent moving parts. The same reason recommends that the motor 35 be arranged to act along a horizontal line. It should be noted, however, that in the event of a significant vertical component of force being applied to the crosshead, the channel shaped tracks confine the wheels 31 of the crosshead such that the crosshead may not rise.

Since the piston rod 37 of the hydraulic motor 35 is pivotally connected to the crosshead 30 (to avoid the application of torque to the piston rod 37) it is necessary that means be provided to prevent the crosshead 30 from twisting about a vertical axis such that the wheels 31 escape from the tracks 11 and 12. This is particularly true if a load is to be lifted which is off center of the lifting yoke 55. Such canting of the crosshead can be avoided by having corresponding sprockets of a pair such as 26 and 27 secured to and rotatable with the shaft on which they are mounted, such as the shaft 25. In such case, the chain segments extending from the sprockets 26 and 27 to the lifting yoke 55 are maintained at equal length and the crosshead cannot cant.

While two chains 51 and 52 and sprockets for them to run on are illustrated as the preferred form, any desired greater or lesser number may be employed and other types of tension members and mating rotary supports therefor may be employed so long as they are of a nature to provide mutually non-slipping engagement where required under the stress conditions expected in use. Also, although it is expected that in most cases loads will be lifted vertically against the pull of gravity and the device, for such use will be located with the tracks 11 and 12 and the frame members 13 and 14 will be positioned horizontally, it is conceivable that load pulls in other than the vertical direction may be desired and that the tracks and frame members for such purpose might be positioned in other than horizontal position.

It will now be seen that load handling apparatus has been described which employs any desired number of single chains each of which operates to produce both the lifting and traversing movements of the yoke 55 or of a load carried thereby. Through arrangement of the chains in accordance with this invention, operation of the motor 35 on the chains 51 and 52 through the crosshead 30 causes raising and lowering of the lifting yoke, whereas operation of the motor 44 on the chains 51 and 52 through the drive shaft 40 causes traversing of the yoke 55 in the direction of the tracks 11 and 12 without a corresponding vertical movement of the yoke. Upon reference to FIGS. 4 and 6 it may be seen that the lifting yoke 55 may be lowered to a greater depth when the carriage 20, and hence the yoke 55, are to the right of the right-hand-most position of the crosshead 30, shown in FIG. 6. When the carriage 20 is to the left of the crosshead position of FIG. 6, as shown in FIG. 4, the traveling movement of the crosshead 30, and hence the lowering of the lifting yoke 55 is restricted. It is for this reason that the present apparatus is particularly well adapted to the movement of a weight between an elevated position near the left-hand end of the travel of the carriage 20 and lifting yoke 55, and a relatively lower position at the right. The apparatus is well adapted, for example, for lifting dies or other heavy tool parts from a truck or platform to the floor or to a press.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described what is claimed is:

1. A load handling apparatus, comprising a track, a load holding carriage movably mounted on said track for traversing the same and a combined load shifting and load pulling mechanism comprising an elongated flexible load bearing member having one portion anchored to said carriage and extending therefrom in one direction along said track, a second portion extending from said carriage in a direction transversely of said track to support a load in use, and a third portion intermediate the first and second portions extending from said carriage in the opposite direction from said first portion, said elongated, flexible load bearing member forming a loop between said first and third portions, means engaging within said loop and determining the size thereof and including a part fixedly positioned and a part movable relative to said track means for moving said member longitudinally of itself within said loop with respect to said part fixed on said track to cause said carriage to traverse said track, means to move said part which is movable relative to said track to change the size of said loop and guide means on said carriage engaging said flexible member between said second and third portions for guided longitudinal movement of said flexible member along its own length relative to said carriage.

2. A load handling apparatus in accordance with claim 1 in which said means for moving the flexible load bearing member longitudinally of itself within the loop includes a rotary driving member having a peripheral portion in non-slipping engagement with the flexible load bearing member.

3. A load handling apparatus in accordance with claim 1 in which said flexible load bearing member is a chain and said means for moving the same longitudinally of itself is a sprocket in driving engagement with the chain.

4. A load handling apparatus in accordance with claim 2 in which said rotary driving member is on an axis fixed relative to said track and constitutes the part fixedly positioned relative to the track.

5. A load handling apparatus in accordance with claim 1 in which said track includes a pair of spaced apart parallel rails and said carriage includes a substantially rigid framework having wheels thereon rotatably engaging said rails, respectively.

6. A load handling apparatus in accordance with claim 1 in which said means to move said part which is movable relative to the track to change the size of the loop is an expansible fluid motor having one element anchored with respect to the track and the other element in engagement with the part movable relative to the track.

7. Weight handling apparatus comprising a pair of rails arranged in parallel relationship, a carriage mounted on and arranged to traverse said rails, a crosshead arranged to traverse said rails, means for moving said crosshead to a desired position along said rails, a first pair of sprockets on axes fixed relative to and adjacent said rails, respectively, means for driving said first pair of sprockets simultaneously, a second pair of sprockets arranged on said crosshead aligned with said first pair of sprockets, a third pair of sprockets arranged on said carriage aligned with said first and second pairs of sprockets, and a pair of chains extending in a direction transversely of said rails over corresponding sprockets of the third pair, around corresponding sprockets of the second pair, around corresponding sprockets of the first pair, and then extending to and anchored to said carriage, whereby movement of said crosshead by said crosshead moving means causes movement of said chains transversely of said rails toward said carriage, and actuation of said means for driving said first pair of sprockets moves said carriage along said rails.

8. Weight handling apparatus as specified in claim 7 wherein a rotatable shaft is provided to which one of said second and third pairs of sprockets is secured such that the sprockets of that pair must rotate together.

9. Weight handling apparatus as specified in claim 7 wherein said crosshead moving means acts along a line parallel to said rails.

10. Weight handling apparatus as specified in claim 7 wherein said rails comprise channels opening toward each other and confining said crosshead against all movement laterally with respect to said rails.

11. Weight handling apparatus as specified in claim 7 wherein said sprockets are so positioned that the segments of said chains extending from said third pair of sprockets to said second pair, from said second pair to said first pair, and from said first pair to said carriage, extend substantially parallel to said rails.

References Cited in the file of this patent
UNITED STATES PATENTS

| | | |
|---|---|---|
| 2,906,413 | Minty | Sept. 29, 1959 |
| 2,940,366 | Daugherty | June 14, 1960 |